Oct. 23, 1956

A. H. GOLDEN ET AL 2,768,014

DEADLOCKING LATCH BOLT

Filed Sept. 21, 1953

INVENTORS
A. H. Golden &
D. L. Biblin
BY

*A. H. Golden*
ATTORNEY

Oct. 23, 1956  A. H. GOLDEN ET AL  2,768,014
DEADLOCKING LATCH BOLT
Filed Sept. 21, 1953  3 Sheets-Sheet 2
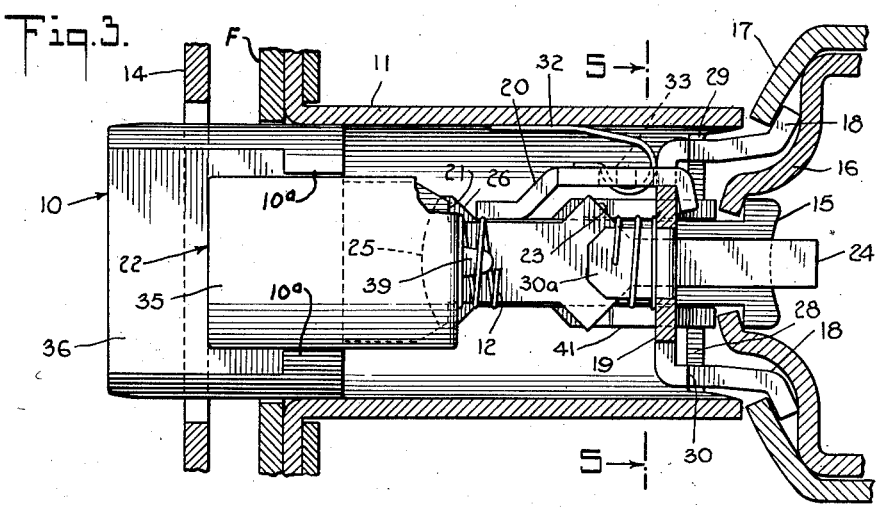
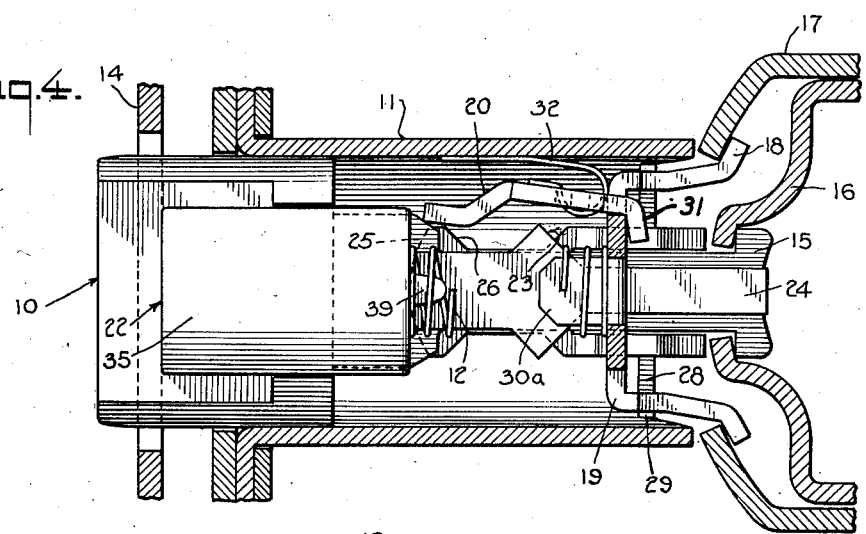
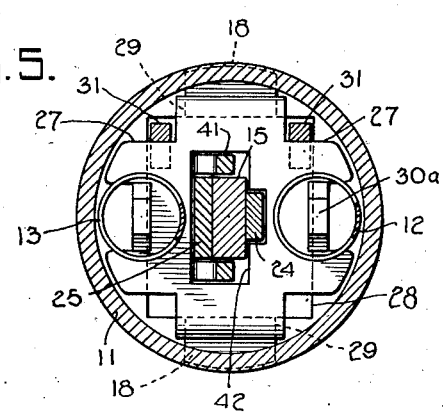
INVENTORS
A. H. Golden + D. L.
BY      Biblin
ATTORNEY

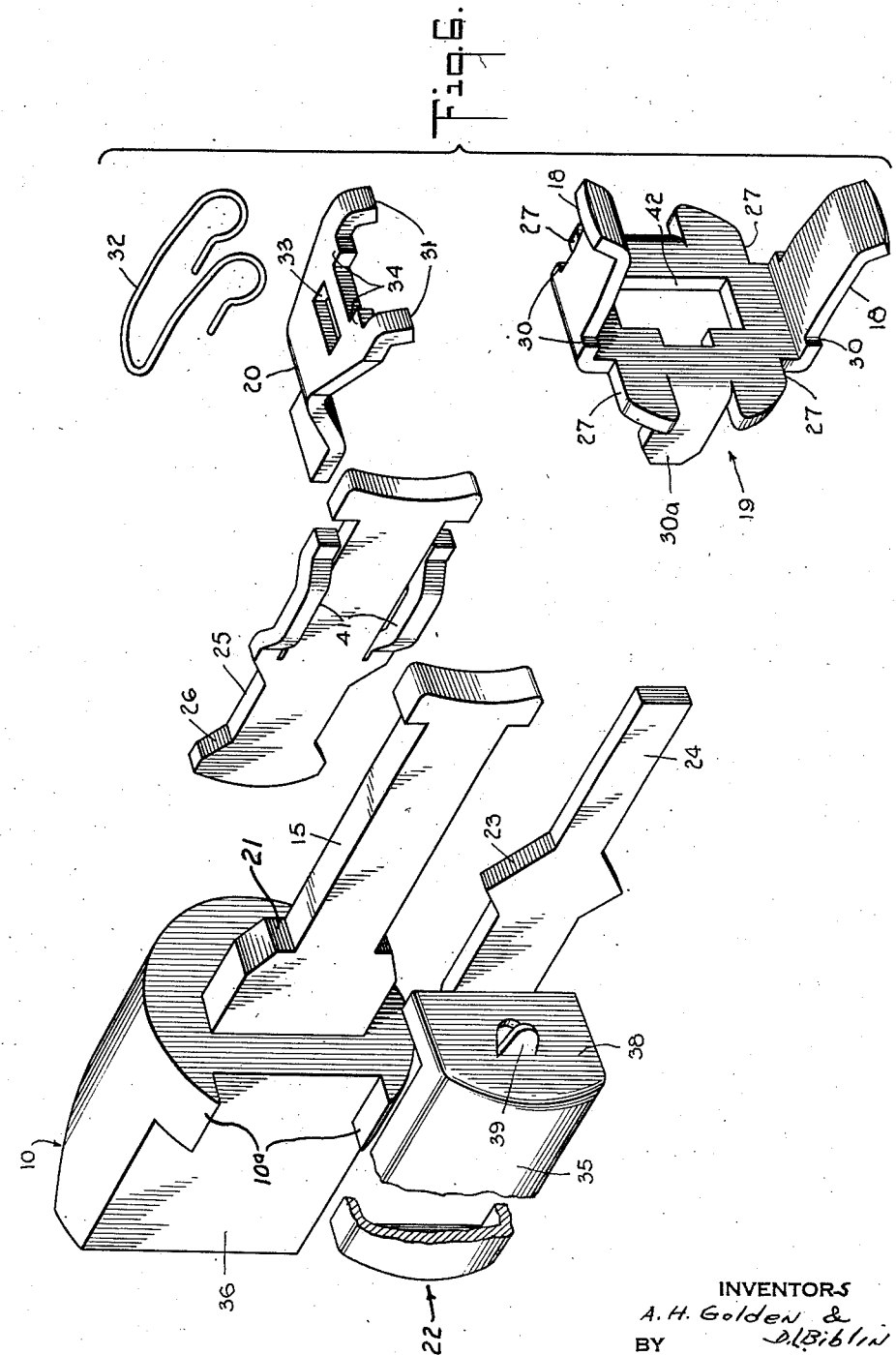

United States Patent Office 2,768,014
Patented Oct. 23, 1956

2,768,014

DEADLOCKING LATCH BOLT

Abraham H. Golden, Stamford, and Daniel L. Biblin, Terryville, Conn., assignors to The Yale & Towne Manufacturing Company, Stamford, Conn., a corporation of Connecticut Application September 21, 1953, Serial No. 381,280

6 Claims. (Cl. 292—169)

This invention relates to latchbolts for tubular locks, and more particularly to deadlocking mechanism for the latchbolt.

In the particular class of locks to which our invention relates, the latchbolt when projected into latching engagement with a strike is automatically deadlocked by a dog. Actually, a trigger bolt is utilized to hold the dog out of deadlocking position when the trigger bolt is in a projected position. The strike holds the trigger bolt retracted at all times when the door is closed, the dog then deadlocking the latchbolt in projected position. Those skilled in the art will understand that the trigger bolt, when not held depressed by the strike in the closed position of the door, moves with the latchbolt to allow depressing of the latchbolt when the door moves to closed position. The latchbolt is retracted by a retractor in a spindle housing that is assembled in the door to a latch tube in which the latchbolt moves, a trigger release being provided through which the retractor moves the deadlocking dog out of dogging position prior to retracting the latchbolt.

The dog in locks of this class is projected to dogging position by spring action, and of course the latchbolt is projected also by spring action. In one example of the prior art, the same springs are utilized to project both the latchbolt and the dog. In this prior art arrangement, the dog is not held positively in assembled relation to the latch tube, but is merely held by the latchbolt springs against an end piece on the tube, the dog pivoting on the end piece in a direction transverse to the tube axis into and out of dogging position. The springs act in a direction along the axis of the latch tube at right angles to the dogging movement of the deadlocking dog and, to permit the springs to coact with the dog, a base on the dog extends laterally away from the pivot point of the dog to a position between the end piece and the inner ends of the springs. However, the springs act only in an indirect way upon the base of the dog through a lever member that is interposed in order to obtain the desired spring action. Pins loosely engage the base of the dog to prevent it from shifting laterally in the latch tube, but these pins do not hold the dog assembled to the end piece and the springs are relied upon for this purpose.

We have now contributed, in a deadlocking mechanism of the particular class, an extremely novel construction through which we hold the deadlocking dog positively assembled to the end piece. As one feature of this novel construction, we utilize an inner surface on the latch tube to confine an end portion of the dog relatively to a bearing on the end piece. When the dog is in assembled position with its end portion so confined by the latch tube, the end portion coacts with the bearing of the end piece to hold the dog assembled to the end piece while allowing the dog to pivot into and out of dogging position.

A further feature resides in a novel arrangement that allows the positive retention of the dog in assembled relation to the end piece. The end portion of the dog is formed to interengage with the bearing of the end piece through a movement that is possible only before the latchbolt and other parts are placed in the latch tube. After assembly of the latchbolt in the latch tube, the latchbolt limits the movement of the dog, and a particular coaction between the dog and the end piece then retains the dog relatively to the end piece.

As another feature of our invention, we provide a spring that acts independently of the latchbolt springs to press the deadlocking dog to dogging position, this spring pressing actually in the direction in which the dog moves, and being engaged preferably between the dog and the side of the latch tube. We thereby accomplish the desired spring action for pressing the dog to dogging position and do not require a modifying lever to obtain this action.

As a further detailed feature of our invention, we construct the trigger bolt in a novel way. The trigger bolt in locks of the particular class includes a head part of considerable thickness that is disposed at the side of the latchbolt in position to engage the strike, and this head part is connected to a relatively narrow tail part that coacts with the deadlocking dog. These parts of the trigger bolt are actually distinct as they are formed in the prior art, but by our invention we contribute a novel unitary trigger bolt having a single piece of sheet metal that forms both the head and the tail of the bolt.

We have thus outlined rather broadly the more important features of our invention in order that the detailed description thereof that follows may be better understood, and in order that our contribution to the art may be better appreciated. There are, of course, additional features of our invention that will be described herinafter, and which will form the subject of the claims appended hereto. Those skilled in the art will appreciate that the conception on which our disclosure is based may readily be utilized as a basis for the designing of other structures for carrying out the several purposes of our invention. It is important, therefore, that the claims be regarded as including such equivalent constructions as do not depart from the spirit and scope of our invention, in order to prevent the appropriation of our invention by those skilled in the art.

Referring now to the drawings:

Fig. 3 is a view similar to Fig. 1, but showing the trigger bolt held depressed by the strike.

Fig. 4 is similar to Fig. 3 but shows the position of the parts as the retracting movement of the latchbolt is initiated.

Fig. 5 is a cross-section on the line 5—5 of Fig. 3.

Fig. 6 is an exploded view showing parts of the latchbolt mechanism in perspective.

Figure 1:
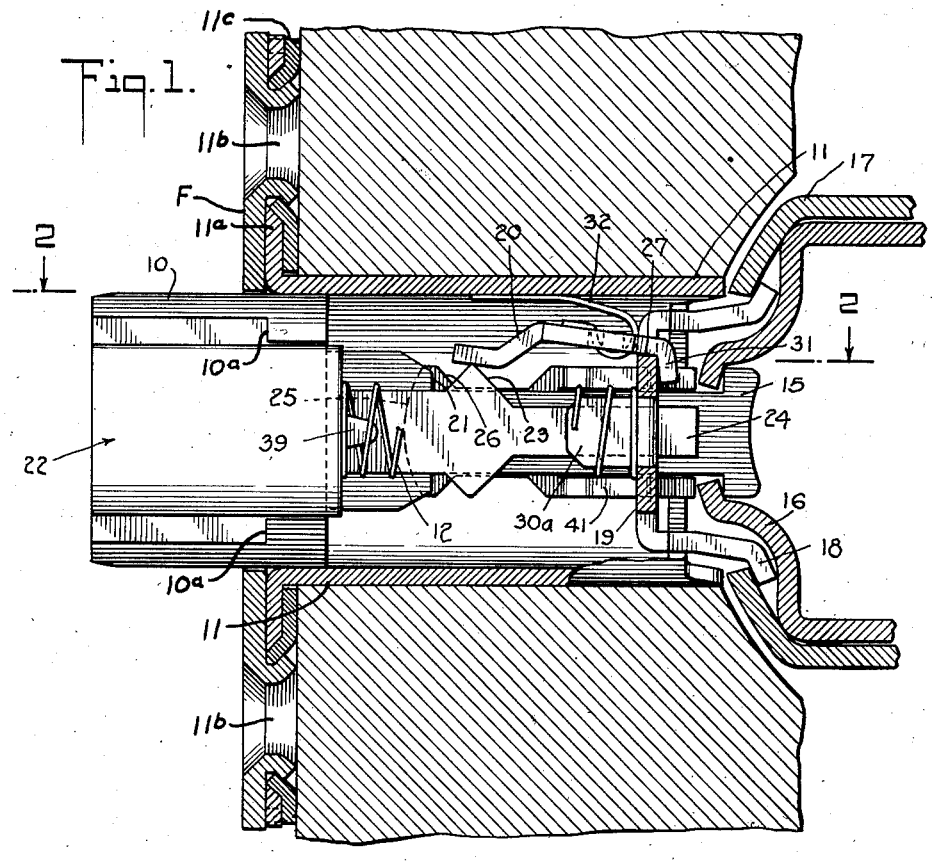
Fig. 1 is a longitudinal sectional view showing a preferred form of our novel deadlocking latchbolt construction.

Before describing in detail our invention, we will first set forth the general arrangement of the parts thereof. Thus, we show in Fig. 6 a latchbolt 10 that slides between projected and retracted positions relatively to a latch tube 11 shown in Figs. 1–5. Coil springs 12, 13 in the latch tube 11 press the latchbolt 10 to a projected position to coact with a strike 14, and a tail 15 on the latchbolt serves as means through which the bolt is retracted by a retractor 16. As will be understood by those skilled in the art, the retractor 16 moves in a spindle housing 17 which is assembled relatively to the latch tube 11 in the door by lug portions 18 on the latch tube. Actually, the lug portions 18 are formed on an end piece 19 on the latch tube 11, as will be further described in due course. To deadlock the latchbolt 10 in projected position, a dog 20, best seen in Fig. 6, moves to dogging position behind a shoulder 21 on the latchbolt tail 15, as shown in Fig. 3, this movement of the dog 20 occurring only when a trigger bolt 22, also best shown in Fig. 6, is held in depressed position relatively to the latchbolt 10, as by engagement with the strike 14. When the trigger bolt 22 is in projected position relatively to the latchbolt, as in Figs. 1 and 2, a cam 23 on the trigger bolt tail 24 holds the dog 20 out of dogging position so that the latchbolt 10 can be depressed through engagement with the strike 14 when the door closes. To permit the retractor 16 to retract the latchbolt 10 when the trigger bolt 22 is held depressed by the strike 14, the retractor when beginning its retracting movement moves a trigger release 25 (Fig. 6), and a cam 26 on the trigger release then moves the dog 20 out of dogging position as illustrated in Fig. 4.

The end piece 19 shown best in Fig. 6 is formed with bearing surfaces 27, there being four of these surfaces at the sides of lug portions 18, as best seen in Fig. 5. While the end piece 19 has four of the surfaces 27, because it is symmetrical in shape, we actually utilize only two of these surfaces. For reasons that will appear, the bearing surfaces 27 are disposed outwardly from the axis of the latch tube 11 in opposed relation to the inner surface of the tube, as shown in Fig. 5.

The lug portions 18 are bent rearwardly some distance from the bearing surfaces 27, and as initially formed are bent toward each other sufficiently to permit the end piece 19 to be inserted through the front end of the latch tube 11, thereafter being bent outwardly into the proper positions to coact with the spindle housing 17, as shown in Fig. 4. The rear end of the latch tube 11 has a relatively large rectangular opening 28, and at opposed sides of this opening are slots 29 through which the lug portions 18 extend. Abutment shoulders 30 are formed on each side of the lug portions 18, as may be seen most clearly in Figs. 2 and 6, and through these shoulders the end piece 19 is seated against the rear end of the latch tube at opposed sides of the slots 29. The rear ends of the latchbolt springs 12, 13 are seated directly upon the end piece 19, the pressure of these springs acting to hold the end piece 19 seated in the latch tube 11. Preferably, lugs 30a are bent forwardly on the end piece 19 to hold the rear ends of the springs 12, 13 in proper alignment.

On the rear end portion of the deadlocking dog 20, we provide angular legs 31 that are spaced sufficiently to extend at each side of one of the lug portions 18 on the end piece 19. In the assembled position of the dog 20, the angular legs 31 are seated for pivotal movement upon the bearing surfaces 27 of the end piece 19, and extend behind the rear surface of the end piece. Also, we form on the dog 20 inwardly of the legs 31 a pair of abutments 34, best seen in Figs. 2 and 6, for engaging the front surface of the end piece 19, and the abutments 34 together with the legs 31 hold the dog 20 against endwise movement relatively to the end piece 19. Further, because of the particular position of the bearing surfaces 27, the legs 31 are confined between these surfaces and the inner surface of the latch tube 11, as may be seen clearly in Fig. 5, so that the dog 20 can not become separated from the end piece 19 through movement away from the tube axis. The particular angular shape of the legs 31 does permit the dog 20 to be assembled and disassembled relatively to the end piece 19 through pivotal movement past the axis of the latch tube 11, but the latchbolt tail 15 prevents this movement when assembled in the tube. Thereby the dog 20 is positively retained for pivotal movement on the end piece 19.

For the particular purpose of moving the deadlocking dog 20 to dogging position, we provide a U-shaped spring 32 that acts between the inner surface of the latch tube 11 and the dog 20. Preferably, the ends of the spring 32 are formed to extend between the angular legs 31 of the dog 20 and then in a reverse direction through an opening 33 in such a way as to press against the outer surface of the dog. Because of this arrangement, the pressure of the spring 32 acts directly toward the dogging position of the dog, and is entirely independent of the action of the latchbolt springs 12, 13.

Figure 2:
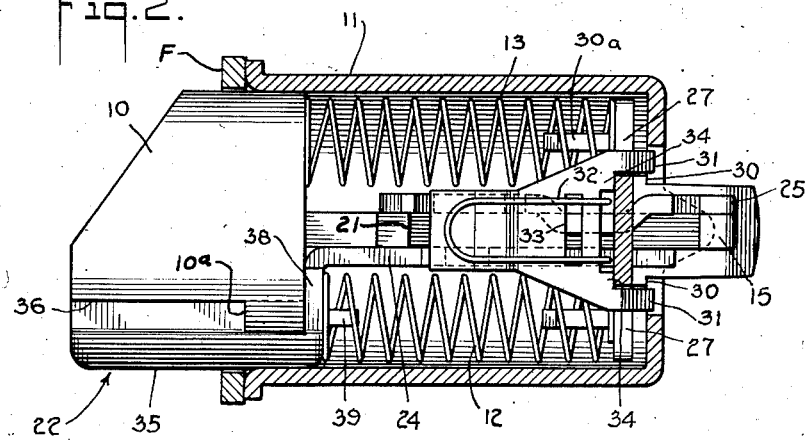
Fig. 2 is a sectional view taken on the line 2—2 of Fig. 1.

We shall now describe in detail our novel trigger bolt 22. In this trigger bolt, we utilize a single piece of sheet metal which we form at one end to provide a concavo-convex head 35. When in assembled position, the head 35 is disposed with its concave side toward a flat side 36 on the latchbolt 10, with coplanar surfaces on the edges of the head 35 sliding on the flat side 36, while the head is guided between lugs 10a on the latchbolt. We form the sheet metal of the trigger bolt with an integral portion 38 that is bent in a transverse direction to form the inner end of the trigger bolt head 35, as shown in Figs. 2 and 6. This transverse portion 38 extends past the coplanar surfaces on the head with one surface on portion 38 in facing relation to the inner end of latchbolt 10. It is the opposed surface of the transverse portion 38 against which the coil spring 12 is actually seated, whereby the spring 12 acts through portion 38 to press the latchbolt 10. A lug 39 is struck out from the sheet metal in the transverse portion 38 and serves to retain the front end of the spring 12 in proper alignment with the trigger bolt. The transverse portion 38 does, of course, prevent the trigger bolt 22 from projecting beyond the latchbolt 10, but by yielding of the spring 12 does permit the trigger bolt to be depressed relatively to the latchbolt, as will be well understood by those acquainted with the art. At the inner end of the transverse portion 38, the sheet metal is bent rearwardly to form the trigger bolt tail 24, upon which we form the cam 23. Actually, we make the trigger bolt tail 24 symmetrical so that it has a cam 23 upon each of its edges, thereby permitting the trigger bolt to coact with the dog 20 whether the dog is assembled above the tail 24, as in Fig. 1, or below the tail 24. By the construction that we have thus described, we contribute a unitary trigger bolt that is extremely simple to manufacture and to assemble in the latchbolt mechanism.

Trigger release 25 operates to move dog 20 out of deadlocking position incidental to the operation of retractor 16. We provide a novel means for guiding trigger release 25 relatively to the latchbolt tail 15. Thus, we form an intermediate portion of the trigger release 25 to be considerably wider than the latchbolt tail 15, thereby providing guide parts 41 for extending beyond the edges of the latchbolt tail. We strike the guide parts 41 out of the plane of the trigger release 25 so as to overlie the edges of the latchbolt tail 15, these parts 41 then extending for a considerable distance along the length of the tail 15 so as to hold the trigger release 25 in proper operating alignment in a vertical direction as viewed in Fig. 1. Those acquainted with the art will understand that the latchbolt tail 15, the trigger bolt tail 24 and the trigger release 25 all slide in an opening 42 in the end piece 19. Actually, because of the particular construction of the trigger release 25, the guide parts 41 support the edges of the latchbolt tail 15 in the opening 42, as shown in Fig. 3.

Not only is the mechanism we have thus described extremely valuable from an operating viewpoint, but it makes possible the efficient and effective assembly of the parts within the latch tube 11. This is of special importance in this art because the parts must operate extremely efficiently within the latch tube, without lubrication many times, and yet give excellent service. It is readily seen also that there must be a sequence of operation of the parts within the latch tube that is different during different operations of the parts. Thus, under certain circumstances, it is the trigger bolt that holds the dog 20 to allow retraction of the latch bolt incidental to the closing of the door in which the lock may be mounted. Under other circumstances, it is the retraction of the trigger release 25 that moves the dog 20 out of deadlocking position away from shoulder 21 of the latch bolt to permit retraction of the latch bolt by the retractor, the retractor moving not only the latch bolt but also the trigger release. Therefore, there must be some spacing between the surface 26 of the trigger release and the shoulder 21 of the latch bolt tail 15.

The presence of so many parts within the tube 11, and the particular coaction of the parts that is required, makes assembly of those parts difficult and troublesome.

Through the particular arrangement we have conceived, the parts shown in Fig. 6 may all be assembled within the tube 11 in a most efficient manner. Thus, the spring 32 is applied to the dog 20 and the dog 20 applied to the endpiece 19. The other three parts of the assembly shown in Fig. 6 are then placed in operative relation in the tube 11. Once within tube 11, the spring 32 will lie against the face of the tube and the dog 20 will be confined against sufficient movement relatively to the tube and the bolt tail 15 to release it from the endpiece 19, and the dog will remain assembled to the endpiece 19 for effective operation thereafter. Upon completion of the assembly of the parts within the tube 11, a front F will be applied to the forward wings 11a of the tube 11 through suitable tubular portions 11b riveted to an inner plate 11c. The front F will coact with the lugs 10a of the latch bolt 10 for maintaining the latch bolt assembled within the tube 11, and of course, the latch bolt will hold the trigger bolt 22 against outward movement from the tube. We believe that the assembly of the parts within the tube 11 and the operation of those parts will now be quite apparent to those skilled in the art.

We now claim:

1. In a lock of the class described, a latch tube, a latchbolt moving in said latch tube to projected and retracted positions and having a tail by which said bolt is retracted, an end piece on said tube relatively to which said latch bolt tail moves as said bolt moves in said latch tube, a spring engaged between said latchbolt and the inside surface of said end piece to press said latchbolt to projected position, a dog, angular legs on said dog, said end piece formed to provide openings through which said angular legs extend past the end piece in a direction outwardly of the latch tube, bearing surfaces in said openings on which the angular legs rest on said end piece to mount said dog for pivotal movement into and out of a position dogging said latchbolt tail, said angular legs engaging said end piece for retaining said dog against endwise movement inwardly of said latch tube away from said end piece, said end piece coacting with the dog to prevent outward movement of the dog relatively to the latch tube, a spring between the latch tube and dog pressing said dog to pivot on said bearing surfaces to dogging position for deadlocking said latchbolt in projected position, and an inner surface on said latch tube confining said angular legs relatively to said bearing surfaces whereby to hold said dog assembled to said end piece.

2. In a lock of the class described, a latch tube, a latchbolt moving in said latch tube to projected and retracted positions and having a tail by which said bolt is retracted, an end piece on said latch tube relatively to which said latchbolt tail moves as said bolt moves in said tube, a spring engaged between said latchbolt and the inside surface of said end piece to press said latchbolt to projected position, a dog, angular legs on said dog, said end piece formed to provide openings through which said angular legs extend past the end piece in a direction outwardly of the latch tube, bearing surfaces in said openings on which said angular legs rest on said end piece to mount said dog for pivotal movement into and out of a position dogging said latchbolt tail, said angular legs engaging said end piece for retaining the dog against endwise movement inwardly of the tube away from the end piece, limiting surfaces through which the dog engages the inner surface of said end piece to prevent endwise movement of the dog outwardly of the latch tube, a spring pressing said dog to pivot on said bearing surfaces to dogging position for deadlocking said latchbolt in projected position, and an inner surface on said latch tube confining said end portion of the dog relatively to said bearing surfaces whereby to hold said dog assembled to said end piece.

3. In a lock of the class described, a latch tube, a latchbolt moving in said latch tube to projected and retracted positions and having a tail by which said bolt is retracted, an end piece on said tube relatively to which said latchbolt tail moves as said bolt moves in said latch tube, a spring having a part seated on the inside surface of said end piece and a part engaging said latchbolt to press said latchbolt to projected position, a dog, said end piece formed to provide openings with bearing surfaces for the dog, a portion of the dog extending through said openings in a direction outwardly of the tube and resting on the bearing surfaces to mount the dog on said end piece for pivotal movement, a further portion of the dog inwardly of the tube moving into and out of a position dogging said latchbolt tail as the dog pivots on the bearing surfaces, a spring having opposed end parts engaging the inside surface of the latch tube and the dog, said dog formed with an opening in spaced relation to the portion that dogs the latchbolt tail, and a curved medial part of said last-mentioned spring engaged in the opening in said dog whereby to hold the spring in position to press said dog to dogging position for deadlocking said latchbolt in projected position.

4. In a lock of the class described, a latch tube, a latchbolt moving in said latch tube to projected and retracted position, a tail on said latchbolt by which said bolt is retracted, an end piece on said latch tube relatively to which said latchbolt tail moves as said bolt moves in said latch tube, a spring acting between said latchbolt and the inside surface of said end piece to press said latchbolt to projected position, a dog, said end piece formed to provide openings with bearing surfaces for the dog, an end portion on said dog extending through said openings past the end piece in a direction outwardly of the latch tube, said end portion formed to hold the dog against endwise movement relatively to the end piece while mounting the dog to pivot on said bearing surfaces into and out of a position dogging said latchbolt tail, a surface on said latch tube confining said end portion of the dog relatively to said bearing surfaces to hold said dog assembled relatively to said end piece, and a spring engaged between said latch tube and said dog and pressing said dog to pivot on said bearing surfaces to dogging position for deadlocking said latchbolt in projected position.

5. In a lock of the class described, a latch tube, an end piece on the rear end of said latch tube, a dog, angular legs on said dog, said end piece formed to provide openings through which said angular legs extend in a direction outwardly of the latch tube, bearing surfaces in said openings on which the angular legs rest to mount the dog for pivotal movement, said dog assembled to the end piece with its legs engaging said bearing surfaces through movement of said dog to a transverse position in said tube, a part of said angular legs moving behind said end piece to retain said dog relatively to said end piece when said dog pivots on said bearing surfaces away from said transverse position, a latchbolt, a tail on said latchbolt, said latchbolt and its tail when assembled in said latch tube moving between projected and retracted positions, a spring pressing said dog to pivot on said bearing surfaces to a position dogging said latchbolt tail whereby to deadlock said latchbolt in projected position, and said latchbolt tail holding said dog against movement to said transverse position to hold said dog in assembled relation to said end piece.

6. In a lock of the class described, a latch tube, a latchbolt moving in said latch tube to projected and retracted positions, a tail on said latchbolt by which said bolt is retracted, a one-piece sheet metal trigger bolt having a concave-convex head terminating in coplanar surfaces bearing on said latchbolt for sliding movement relatively thereto, said latchbolt formed with parts lying at opposed sides of the concave-convex trigger bolt heads whereby to guide the head as it slides on its coplanar surfaces, an integral portion of the sheet metal of the trigger bolt forming the inner end of the trigger bolt head and extending in a transverse direction past said coplanar surfaces, said portion by extending transversely presenting one side in facing relation to an inner end surface on the latchbolt, a spring guide lug struck out from the opposed side of said transversely extending portion, a spring held by said lug in aligned relation to the trigger bolt head and acting against the said opposed side of the transversely extending sheet metal portion to press that portion against the inner end surface of the latchbolt, said spring pressing the trigger bolt toward projected position, a further integral portion of the sheet metal of the trigger bolt forming a relatively narrow trigger bolt tail that extends from the portion that is pressed against the inner end of the latchbolt, a camming surface formed on an edge of said trigger bolt tail, a dog on said latch tube spring pressed toward a position dogging the latchbolt tail, and said camming surface on the trigger bolt tail holding the dog out of dogging position when the trigger bolt is held in projected position by its spring.

References Cited in the file of this patent
UNITED STATES PATENTS

| | | |
|---|---|---|
| 1,148,549 | Sparks | Aug. 3, 1915 |
| 1,876,081 | Schlage | Sept. 6, 1932 |
| 2,124,897 | Shaw | July 26, 1938 |
| 2,250,727 | Schlage | July 29, 1941 |
| 2,272,101 | Voight | Feb. 3, 1942 |
| 2,369,873 | Voight | Feb. 20, 1943 |
| 2,497,750 | Wardwell | Feb. 14, 1950 |